United States Patent [19]

Hart et al.

[11] 3,996,898
[45] Dec. 14, 1976

[54] ROTARY COMBUSTION ENGINE APEX SEAL ARRANGEMENT

[75] Inventors: Jack A. Hart, Mount Clemens; James H. Wolgemuth, Warren, both of Mich.

[73] Assignee: General Motors Corporation, Detroit, Mich.

[22] Filed: Aug. 29, 1975

[21] Appl. No.: 608,925

[52] U.S. Cl. .............................. 123/8.13; 418/117; 418/123
[51] Int. Cl.² ........................................ F02B 53/04
[58] Field of Search .......... 418/122, 123, 124, 113, 418/117; 123/8.13

[56] References Cited
UNITED STATES PATENTS

| | | | |
|---|---|---|---|
| 3,142,440 | 7/1964 | Schagg | 418/117 |
| 3,186,384 | 6/1965 | Fuhrmann | 418/122 |
| 3,194,489 | 7/1965 | Frenzel | 418/122 |
| 3,410,255 | 11/1968 | Winkelmann et al. | 123/8.13 |
| 3,758,243 | 9/1973 | Fox, Jr. | 418/124 |

Primary Examiner—C. J. Husar
Attorney, Agent, or Firm—Ronald L. Phillips

[57] ABSTRACT

A rotary combustion engine having a planetary rotor and side intake ports is provided with an apex seal arrangement comprising two side-by-side seal members providing spaced sealing lines of contact at each rotor apex and wherein communicating grooves in the ends of the two apex seal members and existing corner seals connect the space between the apex seal members to the existing spaces between the side seals and oil seals on the rotor sides which periodically communicate with the side intake ports.

1 Claim, 5 Drawing Figures

U.S. Patent      Dec. 14, 1976      3,996,898
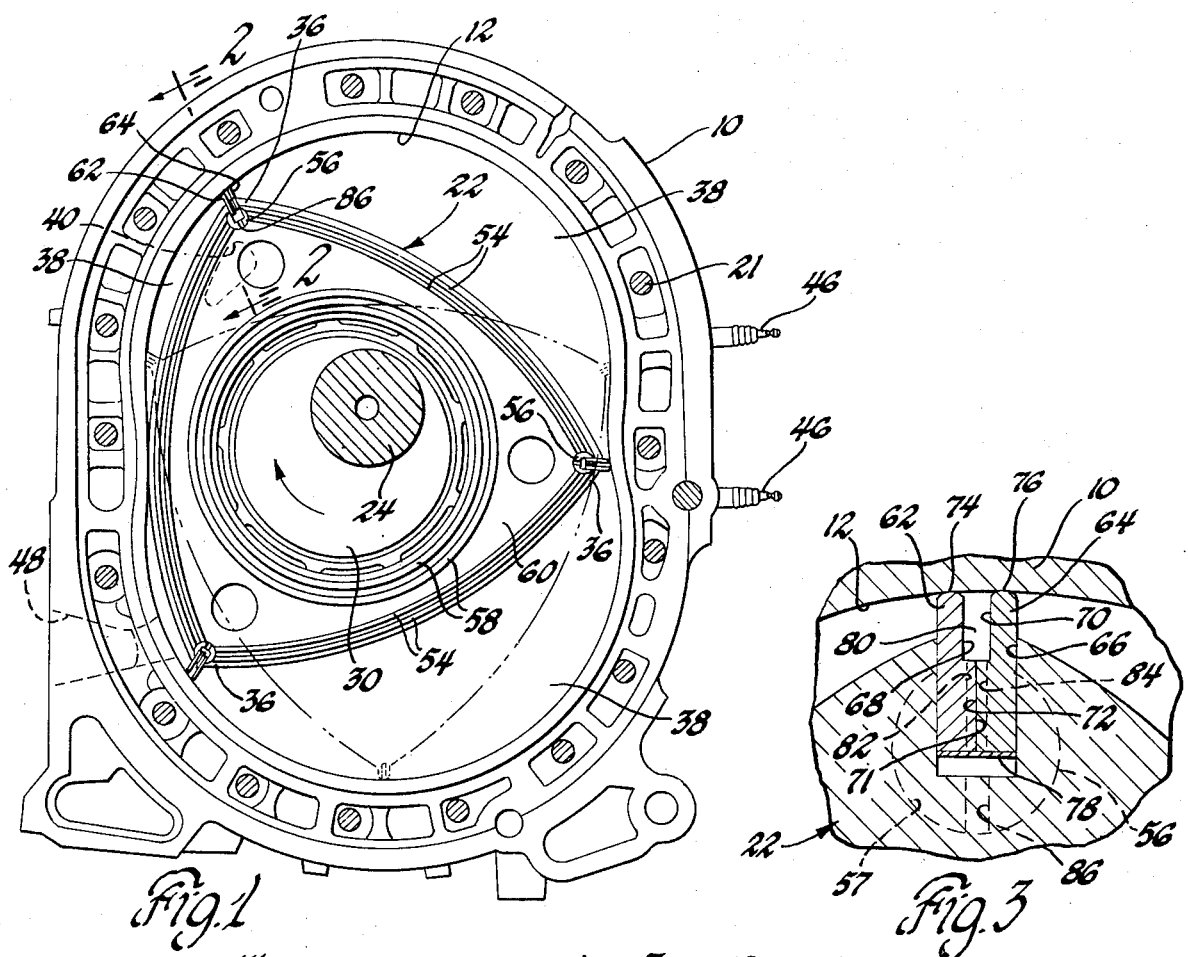
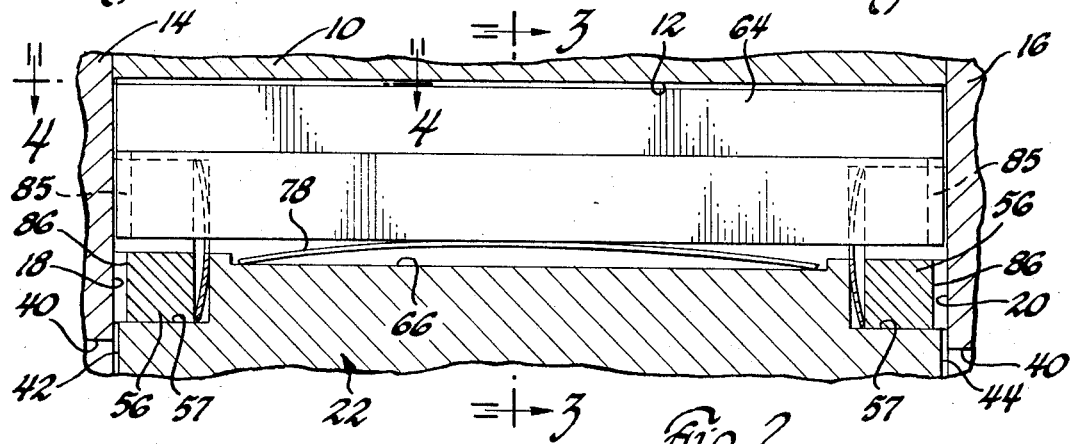
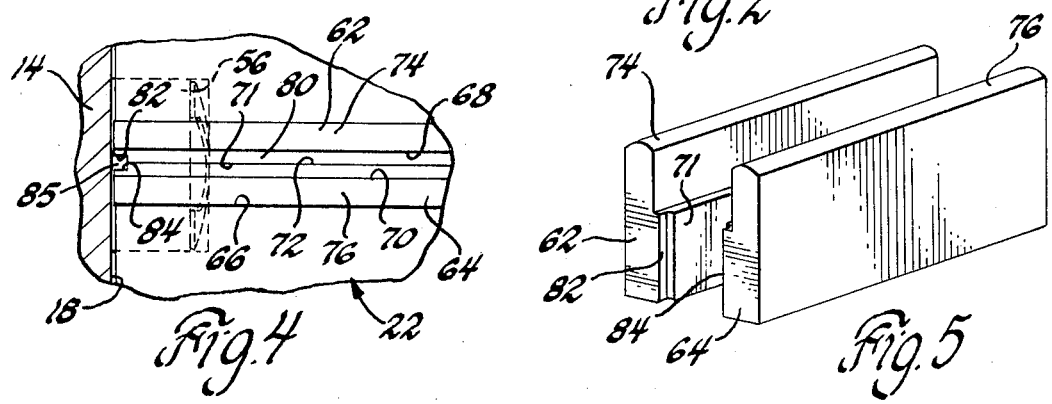

ROTARY COMBUSTION ENGINE APEX SEAL ARRANGEMENT

This invention relates to a rotary combustion engine apex seal arrangement and more particularly to such an apex seal arrangement wherein any leakage gas is directed to the combustion chambers during their intake phase.

In rotary combustion engines having a planetating rotor with an apex seal at each apex which provides sealing between adjacent chambers, it is most difficult if not impossible to prevent any gas leakage past the line of sealing contact which this seal provides. Many different apex seal designs have been proposed to improve the sealing but they are generally complicated and/or difficult to manufacture and still they will have some leakage. Of the many apex seal designs, it is believed that a side-by-side apex seal arrangement providing spaced lines of sealing contact at each rotor apex holds a large degree of promise because of the double sealing, but even here it seems impossible to prevent some small leakage from occurring.

Recognizing the advantages of two lines of sealing contact over just one but rather than attempting to improve upon their separate integrity, the present invention optimizes the sealing between the adjacent combustion chambers by ducting any gas leakage past any one of the lines of sealing contact to the chambers during their intake phase with the accompanying result that such leakage which is believed to be high in hydrocarbons attempts another pass through the engine cycle. Thus, in addition to preventing leakage between chambers, there is effected a reduction in undesirable exhaust emissions. This is readily accomplished in rotary combustion engines of the type currently produced by simply providing, for example, communicating grooves or slots in the ends of side-by-side apex seal members and the adjoining corner seal in each rotor side whereby the space between the two lines of sealing contact is thus connected to the annular spaces between the side seals and oil seals on each rotor side and is thereby connected periodically to the intake ports when the latter are uncovered by the sides of the rotor.

An object of the present invention is to provide a new and improved rotary combustion engine apex seal arrangement.

Another object is to provide in a rotary combustion engine a side-by-side apex seal arrangement at each rotor apex wherein the space between the two lines of sealing contact is connected to the combustion chambers during their intake phase so that any gas leakage past either sealing line is subsequently inducted into the combustion chambers for another attempted pass through the engine cycle.

Another object is to provide in a rotary combustion engine with side intake ports an apex seal arrangement at each rotor apex having side-by-side apex seal members providing a pair of spaced lines of sealing contact between adjacent combustion chambers wherein the space between the two lines of contact are connected via passages in the corner seals to existing spaces between the side seals and oil seals on the rotor sides which have periodic connection with the side intake ports whereby any gas leakage past either of the lines of sealing contact between adjacent chambers is subsequently inducted by the chambers during their intake phase.

These and other objects of the present invention will be more apparent from the following description and drawing in which:

FIG. 1 is an end view with an end housing removed of a rotary combustion engine having an apex seal arrangement according to the present invention.

FIG. 2 is an enlarged view taken along the line 2—2 in FIG. 1.

FIG. 3 is a view taken along the line 3—3 in FIG. 2.

FIG. 4 is a view taken along the line 4—4 in FIG. 2.

FIG. 5 is a partial perspective view of the side-by-side apex seal members.

A preferred embodiment of the apex seal arrangement according to the present invention is employed in the rotary combustion engine shown in FIGS. 1 and 2. The engine comprises a rotor housing 10 having an inner peripheral wall 12 and a pair of end housing 14 and 16 having side walls 18 and 20 facing each other. The housings are secured together by bolts 21 and the inner peripheral wall 12 commonly conforms to a curve outside of and parallel to a two-lobe epitrochoid and cooperates with the side walls 18 and 20 to provide a cavity in which a generally triangularly shaped rotor 22 is mounted. A crankshaft 24 extends through the cavity and is journalled in the end housings 14 and 16. The rotor 22 is rotatably supported on an eccentric 30 formed on the crank-shaft and planetates in certain phase relationship with the crankshaft by means of gearing, not shown. This gearing comprises an internal tooth rotary phasing gear on the rotor which meshes with an external tooth annular stationary phasing gear that is secured to one of the end housings. The rotary phasing gear is concentric with the rotor and has one and one-half times the number of teeth as the stationary phasing gear which is concentric with the crank-shaft so that there is enforced a fixed relationship between the rotor and the crank-shaft and the housing structure wherein each of the three rotor apexes 36 remain adjacent the peripheral wall 12 as the rotor rotates and there is defined between these apexes a total of three expansible combustion chambers 38 that move with the rotor while expanding and contracting twice during each rotor revolution in fixed relation to the housing.

A combustible mixture is delivered to the chambers 38 through side intake ports 40 in the side walls 18 and 20. The intake ports 40 face each other and are arranged such that they are opened to the chambers past the respective rotor sides 42 and 44 as the chambers expand in an intake phase as shown by the phantom-line rotor position in FIG. 1 and are thereafter closed by the respective rotor sides as shown by the full-line rotor position in this Figure when these chambers then contract to compress the mixture in a compression phase as the rotor turns in the direction of the arrow. At the end of the compression phase, the compressed mixture is ignited by one or two spark plugs 46 mounted on the rotor housing whereupon the chambers expand in a power or expansion phase and thereafter are exhausted as they contract in an exhaust phase by an exhaust port 48 through the inner peripheral wall 12 in the rotor housing which is traversed by the rotor apexes.

Typically, the chambers 38 are sealed by an apex seal arrangement across each rotor apex, a pair of parallel spring biased side seals 54 mounted in grooves in each rotor side adjacent each rotor flank and a spring biased corner seal 56 mounted in a hole 57 in each rotor side at each apex that provides a sealing link between the adjacent ends of the side seals and apex seal at each apex. In such an arrangement the apex seals are urged radially outward to engage the peripheral wall 12 and the corner seals 56 and side seals 54 are urged axially outward to engage the opposite side wall. In addition to the gas sealing arrangement, there is also normally provided a pair of oil seals 58 mounted in concentric grooves in each rotor side which are urged axially outward to engage the opposite side wall to prevent the oil used for lubrication of the crankshaft, rotor, etc., from reaching the working chambers. The details of the engine structure thus far described are conventional and for the purposes of understanding the present invention it is important to recognize that in such an arrangement the side seals 54 slide over the intake port 40 on their side but the oil seals 58 do not and the annular space 60 thus formed on each rotor side between the side seals 54 and oil seals 58 is therefore periodically open to the intake port on that rotor side during the intake phase of each working chamber that occurs during each revolution. This condition is shown in FIGS. 1 and 2 and occurs as demonstrated by the full-line rotor position when the intake ports 40 span or bridge the side seals 54 during the intake phase of the chamber and ceases when this chamber enters the compression phase as demonstrated by the phantom rotor position.

In a preferred specific embodiment the present invention utilizes the available sealed spaces 60 to help provide improved apex sealing and also reduction of unburned hydrocarbons as will now be described in detail. Rather than utilizing a single line of sealing contact between each rotor apex and the inner peripheral wall 12 a pair of one-piece apex seal members 62 and 64 are mounted side-by-side in a single slot 66 which is cut across each rotor apex and joins at its opposite ends with the holes 57 accommodating the corner seals 56. The apex seal members 62 and 64 have a rectangular shape viewed from the side as can be seen in FIG. 2 and are provided with very small end clearance relative to the side walls 18 and 20. In addition, the seal members 62 and 64 have a generally rectangular cross-section as shown in FIG. 3 and are provided with steps 68 and 70 respectively which face each other and are located radially outward of where their interfaces 71 and 72 contact within the slot 66. The steps 68 and 70 extend the length of the seal members and leave reduced rectangular sections which are provided at their radially outer edge with rounded surfaces 74 and 76 respectively that are engageable with the inner peripheral wall 12 of the rotor housing. The apex seal members 62 and 64 are urged radially outward by a single leaf spring 78, or they may be urged by separate springs, to contact the peripheral wall. During engine operation these seals are also urged radially outwardly by centrifugal force and by gas pressure which will pass through the small clearance on either outboard side of the apex seal member to the bottom of the apex seal slot 66.

Thus, there are provided two parallel lines of sealing contact with the peripheral wall 12 at each rotor apex while the steps 68 and 70 form an enlarged sealed space or chamber 80 to which any gas leakage past either of the lines of sealing contact may enter. To duct any such leakage away, there are provided steps 82 and 84 in the opposite ends and at the interfaces of the respective apex seal members 62 and 64. The steps 82 and 84 form a sealed passage 85 which is open at its radially outer end to the chamber 80 between the apex seal members. The lower end of the sealed passage 85 is connected to the annular sealed space 60 between the side seals 54 and oil seals 58 by a radial slot 86 formed in each sealing end of the corner seal 56 at this apex. Thus, any gas leakage across either of the lines of sealing contact provided by the apex sealing surfaces 74 and 76 is received by the chamber 80 therebetween and will then be drawn to the intake ports 40 as they intermittently or periodically open to the annular spaces 60 and thereafter be inducted into the combustion chambers during their intake phase. Furthermore, it is known that during and after combustion there can be leakage across both the trailing and leading apexes of each chamber and since both of these leakages are believed to be high in hydrocarbons the present invention has the added advantage then of reducing hydrocarbon emissions by such leakage circulation wherein these gases are caused to attempt another pass through the engine cycle.

It will be appreciated that the present invention is demonstrated in conjunction with the side intake ports and normally found in present production rotary engines of this type. Where the intake ports are otherwise disposed, the spaces between the side seals and oil seals would be connected thereto accordingly or directly to the combustion chambers during their intake phase by suitable passages in the engine housing. Furthermore, in the event that the side seals directly engage the apex seals as has been proposed by some, the leakage ducts in the ends of the apex seal arrangement would then deliver any gas leakage directly to the spaces between the side seals and oil seals and thus to the intake ports. Furthermore, it will be appreciated that each of the apex seal members can be of a suitable multi-piece design for tighter sealing and in that case the leakage ducts would be formed in the one or more end pieces of the chosen design.

The above described embodiments are illustrative of the invention which may be modified within the scope of the appended claims.

We claim:

1. A rotary combustion engine comprising housing means having an internal peripheral wall and side walls which face each other, a rotor rotatably mounted in said housing means with sides facing said side walls and flanks having apexes that remain adjacent said peripheral wall as said rotor rotates, said rotor and said walls cooperatively providing a plurality of expansible chambers, intake ports in said side walls openable by said rotor sides to deliver a combustible gaseous mixture to said chambers as they expand in an intake phase, ignition means for igniting the mixture in said chambers following a combustion phase whereupon they expand in an expansion phase, an exhaust port openable by said rotor to exhaust said chambers as they contract in an exhaust phase, a pair of apex seal members mounted in a slot in and extending the width of each apex of said rotor, each pair of said apex seal members providing two spaced lines of sealing contact with said peripheral wall between adjacent chambers with a sealed space between said lines of sealing contact, gas seal means including side seals and corner seals mounted on said rotor sides sealingly engaging the oppositely facing side walls for providing sealing of said chambers adjacent the flanks of said rotor wherein said side seals pass over said intake ports during the opening and closing of said intake ports to said chambers, each said corner seal having a slot receiving the ends of one pair of said apex seal members, annular oil seal means mounted on said rotor sides radially inward of said gas seal means for engaging the oppositely facing side walls to prevent radially outward oil movement wherein the oil seal means are always radially inward of and never pass over said intake ports whereby there are provided sealed annular spaces between the gas seal means and oil seal means on said rotor sides that are opened to said intake ports during the intake phase of said chambers, and each pair of apex seal members and the associated said corner seal on both sides of said rotor having communicating external passageways for cooperating with the said side wall that they face to provide sealed gas leakage passage means continuously connecting each of said sealed spaces between the pairs of said apex seal members to said sealed annular spaces whereby any gas leakage from said chambers past any one of the lines of sealing contact of said apex seal members is directed by said sealed annular spaces to said intake ports to thereafter be inducted into said chambers during their intake phase.

* * * * *